United States Patent [19]

Gilliland

[11] Patent Number: 4,782,436
[45] Date of Patent: Nov. 1, 1988

[54] APPARATUS AND METHOD FOR BALANCING OUTPUT CURRENT OF TRANSISTORS

[76] Inventor: Malcolm T. Gilliland, 310 Pine Valley Rd., Marietta, Ga. 30067

[21] Appl. No.: 117,227

[22] Filed: Nov. 4, 1987

Related U.S. Application Data

[62] Division of Ser. No. 791,224, Oct. 25, 1985, Pat. No. 4,716,274.

[51] Int. Cl.$^4$ .................... H02H 7/122; H02M 7/538
[52] U.S. Cl. ..................................... 363/56; 330/272; 363/26; 363/134
[58] Field of Search .................................. 363/24–26, 363/56, 98, 134; 330/266, 272, 276; 307/296.1, 296.6, 310

[56] References Cited

U.S. PATENT DOCUMENTS

| | | | |
|---|---|---|---|
| 3,278,721 | 10/1966 | Roe | 219/131 |
| 4,005,352 | 1/1977 | Kugler et al. | 363/26 |
| 4,117,304 | 9/1978 | Wodzinski et al. | 219/130.1 |
| 4,140,976 | 2/1979 | Wartofsky | 330/266 |
| 4,301,355 | 11/1981 | Kimbrough et al. | 219/137 PS |
| 4,307,441 | 12/1981 | Bello | 363/25 |
| 4,349,720 | 9/1982 | Mäkimaa | 219/130.33 |
| 4,409,465 | 10/1983 | Yamamoto et al. | 219/137 PS |
| 4,427,874 | 1/1984 | Tabata et al. | 219/130.51 |
| 4,672,175 | 6/1987 | Niven | 219/130.4 |

FOREIGN PATENT DOCUMENTS

| | | | |
|---|---|---|---|
| 2339720 | 4/1974 | Fed. Rep. of Germany | 330/272 |
| 2658529 | 6/1978 | Fed. Rep. of Germany | 363/134 |

Primary Examiner—William H. Beha, Jr.
Attorney, Agent, or Firm—Jones, Askew & Lunsford

[57] ABSTRACT

An apparatus for allowing the use of unmatched transistors in a power supply is shown. A potentiometer (482) and a switch (481) divert base drive current away from the transistor having the higher Beta so that the collector currents of the two transistors (477, 484) can be matched. Heat sensitive resistors (480, 483) are thermally connected to the opposing transistor (484, 477) so if the temperature and collector current of one transistor should increase the base drive to the other transistor is automatically increased, thereby causing the collector currents to remain matched. The total collector current provided by the transistors (477, 484) is limited to a safe value by a regulating pulsewidth modulator (457). The use of additional protective diodes (468, 469, 478, 479) prevent transient voltages from affecting the transistors (477, 484) and allow the use of lower power, less expensive transistors.

19 Claims, 3 Drawing Sheets

APPARATUS AND METHOD FOR BALANCING OUTPUT CURRENT OF TRANSISTORS

This is a divisional application of U.S. patent application Ser. No. 791,224, filed Oct. 25, 1985, by Malcolm T. Gilliland, entitled "Distributed Station Welding System", now U.S. Pat. No. 4,716,274, issued Dec. 29, 1987.

TECHNICAL FIELD

The present invention relates to DC-to-DC converter power supplies and in particular to a DC-to-DC converter which uses unmatched transistors.

BACKGROUND OF THE INVENTION

There is a problem in the state of the prior art, not limited to the environment of welding power supplies, which has been overcome by the present invention. As is well known to those skilled in the art, the design of reliable push-pull amplifiers, whether they be linear amplifiers or push-pull devices used in switching power supply regulators, have always been considered to require closely matched pairs of output devices. This goes back to the days of push-pull vacuum tube audio amplifiers. In the design of push-pull solid state amplifiers, this problem has become more critical since excessive gain in one transistor of a push-pull amplifier stage normally leads to greater power dissipation and thus a higher operating temperature for that particular transistor. As the operating temperature increases, the beta of the transistor tends to increase, and this ultimately leads to a condition known as thermal run-away in which the higher beta transistor will be destroyed.

As is also known to those skilled in the art, matched pairs of transistors of a particular type tend to be considerably more expensive than individual transistors of the same type. This cost increase becomes even greater when relatively high current devices, such as those used in relatively large switching power supplies, are used. Thus, there is a need in the art to provide a practical and reliable arrangement for designing push-pull amplifier output stages (which may be used in switching power supplies, linear amplifiers, and other applications for push-pull topology) which can eliminate the requirement for transistors having closely matched betas and thermal characteristics.

SUMMARY OF THE INVENTION

The present invention overcomes the drawbacks of the prior art recited above and provides some less expensive advantageous arrangements for accomplishing some end results known in the prior art.

The present invention includes a novel arrangement for biasing a pair of transistors used in a push-pull configuration. In the preferred embodiment of the present invention, the push-pull stage in question is driving the primary of a power transformer which is used in generating well regulated lower voltage power supplies used to power a number of the lower voltage integrated circuit components in the preferred embodiment. However, the principle of this aspect of the present invention has utility in a large number of other applications in which power transistors are interconnected in a fashion in which they need to conduct substantially equal amounts of average current in order to avoid the circumstances of one transistor going into thermal run-away. For example, push-pull power output stages in audio amplifiers may benefit from this aspect of the present invention. Also, parallel power transistor configurations may be rendered less expensive by adoption of this aspect of the present invention.

Generally stated, this aspect of the present invention can be used to provide considerable cost savings to the manufacturer of devices which normally require matched pairs of set of transistors. As is known to those skilled in the art, matched pairs of transistors are ones (ofter obtained from the same die during fabrication) which have closely matched characteristic. Of particular concern is the forward current gain or beta, of transistors having similar or common base drives. As noted above, in the preferred embodiment, the arrangement meeting this requirement is that of a push-pull switching amplifier driving an inductive load.

As is known to those skilled in the art, if one of the transistors in such an arrangement has a somewhat higher beta than the other, it will draw more current than the other transistor. This leads to a situation in which the junction temperature of the higher beta transistor becomes higher than that of the other transistor. As junction temperature increases, beta increases and thus the situation is exacerbated by a form of positive feedback.

As is known to those skilled in the art, eventually this situation leads to thermal run-away and destruction of the higher beta transistor. This is why such amplifier arrangements are conventionally constructed using matched pairs of devices. In the situation of parallel drive transistors, unless power wasting emitter resistors are use, one transistor tends to "hog" more current than the others. Under these circumstances, the collector-emitter saturation voltage is also decreased as the transistor heats up, and destruction of one of the devices often results, frequently followed by a chain reaction destruction of the other transistors as they try to accommodate the increase in current caused by the destruction of the first transistor.

The main drawback to matched transistors, particularly relatively high power devices, is that they are much more expensive than buying a plurality of transistors of the same type which do not necessarily have their characteristics closely matched, other than the extent to which they are matched by virtue of being the same type device. The present invention provides a mechanism for using non-matched pairs of transistors in circumstances in which the conventional wisdom of the prior art dictates that matched pairs be used.

Broadly stated, this aspect of the present invention provides thermally sensitive base drive to each of the transistors in question. Each of the thermally sensitive base drive elements is thermally coupled to a heat sink connected to the other transistor of the pair. In the preferred embodiment, each transistor includes a base emitter resistor having a positive temperature coefficient which is mounted on the heat sink or case of the other transistor. As a second transistor becomes hotter than a first transistor, the base emitter resistor of the first transistor heats up, thus increasing its value. This has the effect of shunting less of the input current from the base of the first transistor, thus increasing the first transistor's base drive. Therefore, the first transistor begins conducting more current and the pair moves toward an equilibrium condition.

In the preferred embodiment, a potentiometer is connected as a variable resistor between the common connection between the emitters of the drive transistors and a switch. The switch is configured to selectively connect the other end of the variable resistor to the base of either of the drive transistors. This arrangement is used to initially calibrate the transistor pair. The switch is moved back and forth between the two bases as the variable resistance is adjusted until an initial condition of equality between the currents conducted by the two transistors is established. Once the device is subsequently operated, the above-reference thermal feedback connection is used to maintain this initially established equilibrium.

It is an object of the present invention to provide an inexpensive implementation of a standard transistor circuit by providing apparatus which allows the use of unmatched pairs of transistors in a circuit configuration normally requiring matched pairs.

That present invention accomplishes this objective, and overcomes the drawbacks of the prior art noted above, will be apparent from the detailed description of the preferred embodiment below.

DETAILED DESCRIPTION

Figure 1:
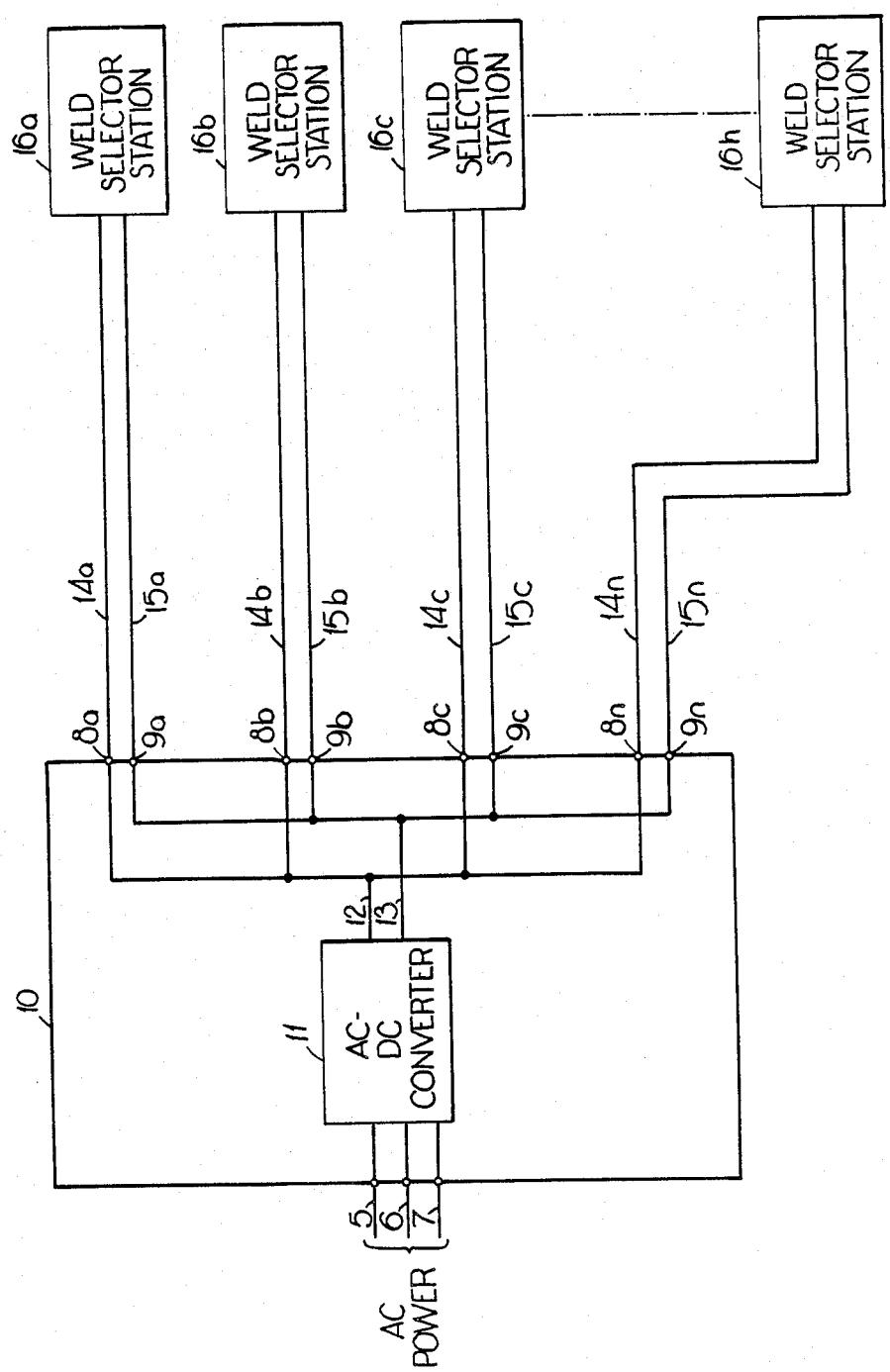
FIG. 1 is a block diagram of the preferred embodiment of the present invention.

Turning now to the drawings, in which like numerals reference like elements throughout the several drawings, the preferred embodiment of the present invention will be described. As shown in FIG. 1, the preferred form of the present invention is a central welding power supply 10 feeding a number of remote weld selector stations 16a–16n. Central welding power supply 10 contains a single AC-to-DC converter 11 for providing power to the weld selector stations 16a–n.

Converter 11 is connected to a source of three-phase AC power (not shown), normally of 460 or 230 volts, by conductors 5, 6 and 7. The positive output of AC-to-DC converter 11 is connected by conductor 12 to a number of positive output studs 8a–8n. The negative, or return, output of converter 11 is connected by conductor 13 to a number of grounded output studs 9a–9n. It will be appreciated that the studs 8 and 9 are conventional in nature and provide the connection point at the weld selector station for the welder.

Converter 11 provides an output of 80 volts DC (nominal) at a current sufficient to power the desired number of remote weld selector stations 16a–16n. In the preferred embodiment, converter 11 provides 1500 amps (continuous) current. Methods of construction of central power supply 10 are well known to those skilled in the art. Remote weld selector stations 16a–16n are connected by conductors 14a–14n and 15a–15n to studs 8a–8n and 9a–9n, respectively.

Each remote weld selector station 16 can accept an input voltage of 30 to 150 volts (80 volts nominal) and has its own controls for varying voltage and current characteristics. This allows a welder using a remote weld selector station 16a to adjust the voltage and current output characteristics to match the type of welding that welder is performing without affecting the voltage and current characteristics of remote weld selector stations 16b–16n.

It will be appreciated the present invention requires only a single central power supply 10 and a single AC power connection instead of the multiple power supplies and AC power connections of conventional systems. Furthermore, it will be appreciated that since the remote weld selector station 16 weighs only 80 pounds it can be readily moved from place to place as required.

It will also be appreciated that, in conventional welding systems, because of the high currents involved, the length of the electrical cable between power supply and welder has a significant effect on the quality of the welding performed. Each remote weld selector station 16 therefore acts as a buffer between the central power supply 10 and the welder. It will therefore be appreciated that the present invention effectively reduces the length of electrical cable to the short distance between the remote weld selector station 16 and the welder. The present invention therefore reduces the cost of a welding system by minimizing the amount of expensive control cable and gas hose used. The present invention also reduces the cost of a welding system by consolidating several smaller power supplies into one central power supply 10 and greatly reducing the number of AC power connections that must be installed.

Weld selector station 16 may be briefly described as a high efficiency, overload protected, selectable constant current or constant voltage switching power supply with automatic compensation for input voltage fluctuation, and selectable low frequency pulse, high frequency pulse, and chopped low frequency pulse outputs.

The circuit power supplies 38 provide the following output voltage to other circuits of the weld selector station: ±14, ±7, +15, +66.7, +1.0. Details of the construction and operation of the other components and circuits of the weld selector station 16 are provided in U.S. Pat. No. 4,716,274, above.

Figure 3:
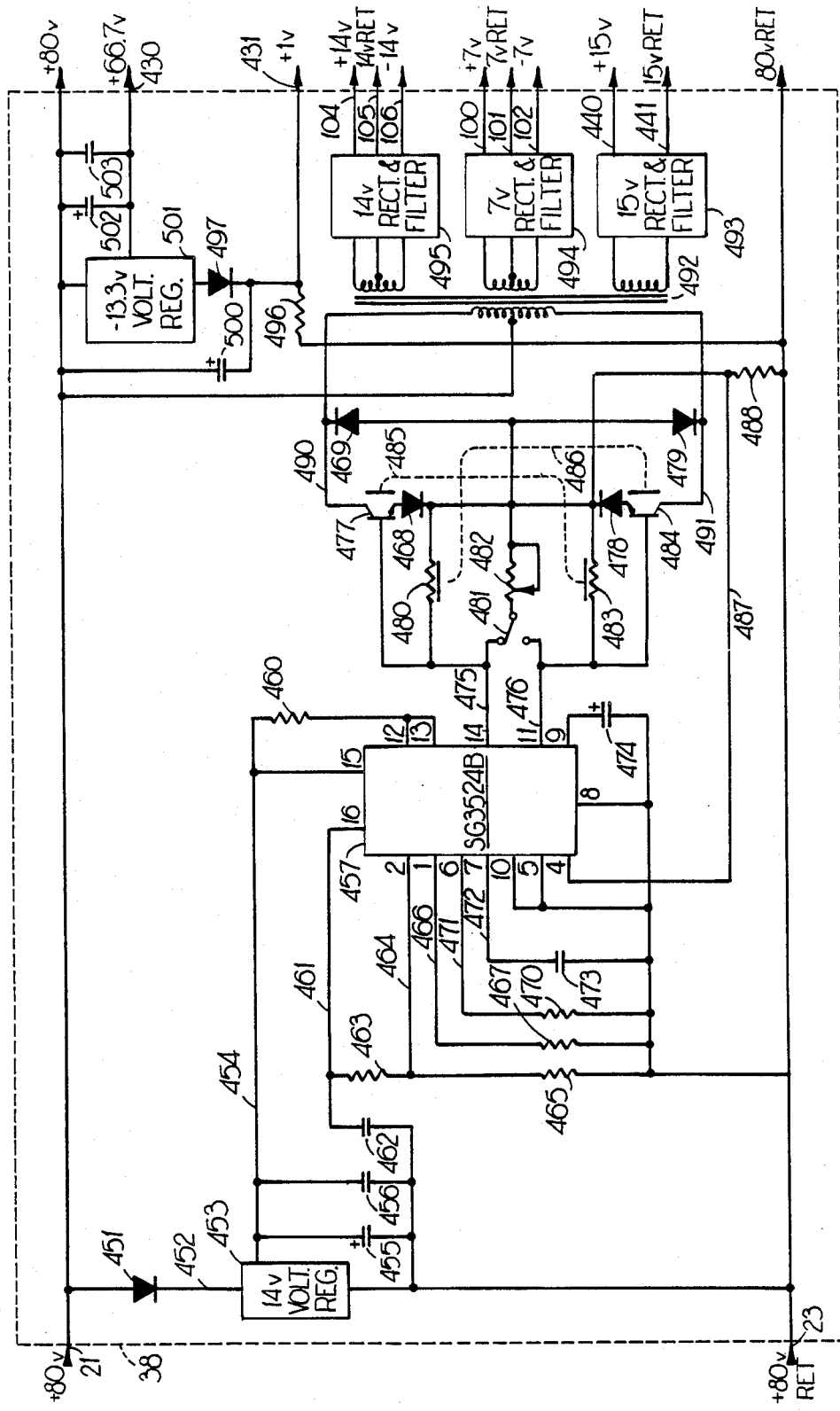
FIG. 3 is a schematic diagram of the power supply circuits of the preferred embodiment.

Turn now to FIG. 3, which is a schematic diagram of circuit power supplies 38. Input power is provided to power supplies 38 by +80 volt conductor 21 and 80 volt return conductor 23 which also serves as the circuit ground. Regulator 453 and filter capacitors 455 and 456 provide regulated 14 volts to PIN 15 of modulator 457. Modulator 457 is a regulating pulsewidth modulator such as the SG3524B manufactured by Silicon General, Garden Grove, Calif. The SG3524B, although almost identical in overall function to the SG3524/LM3524, is an improved device with additional protection features and should be used, in circuit power supplies 38, instead of the SC3524 manufactured by Silicon General, or the LM3524 manufactured by National Semiconductor Corporation, Santa Clara, Calif. Capacitor 462 provides additional filtering for the +5 volt regulated output (PIN 16) of modulator 457.

Resistor 470 and capacitor 473 were selected to yield a frequency of approximately 15 kHz for the oscillator in modulator 457. This frequency is not critical but should be within the input frequency specification of power transformer 492. Resistors 463 and 465 form a voltage divider which places approximately 2.5 volts on the non-inverting input (PIN 2) of the error amplifer of modulator 457. The inverting input (PIN 1) of this error amplifier is connected to circuit ground 23 through an input current balancing resistor 467.

The compensation input (PIN 9) of modulator 457 is connected to circuit ground 23 through one microfarad capacitor 474. It will be appreciated that, as configured, and except as described below, the error amplifier of modulator 457 will charge capacitor 474 to approximately 4 to 5 volts, thereby yielding an output pulsewidth of about 90 percent of the period of the frequency of the oscillator of modulator 457.

The shutdown input (PIN 10) of modulator 457 is not used and is connected to circuit ground 23.

Overcurrent protection for transistors 477 and 484 is provided by the current limiter of modulator 457. The CL− input (PIN 5) of modulator 457 is connected to circuit ground 23. The CL+ input (PIN 4) of modulator 457 is, as explained below, connected to sense the current passing through transistors 477 and 484.

If this current exceeds the safe value for transistors 477 and 484, the current limiter of modulator 457 begins discharging capacitor 474 and lowering the voltage on the compensation input of modulator 457. This reduces the pulsewidth, and therefore the current through transistors 477 and 484.

The collectors (PINS 12 and 13) of the output transistors of modulator 457 are connected to +14 volt conductor 454 through 110 ohm current limiting resistor 460. The emitter (PIN 14) of the Q output transistor of modulator 457 is connected by conductor 475 to the base of NPN Darlington power transistor 477, one end of 47 ohm base shunt resistor 480, and one contact of SPDT switch 481. The emitter (PIN 11) of the negated Q output transistor of modulator 457 is connected by conductor 476 to the base of NPN Darlington power transistor 484, one end of 47 ohm base shunt resistor 483, and the other contact switch 481.

The emitter of transistor 477 is connected to the anode of blocking diode 468. The collector of transistor 477 is connected by conductor 490 to the cathode of reverse voltage protection diode 469 and one end of the primary of power transformer 492.

The emitter of transister 484 is connected to the anode of blocking diode 478. The collector of transistor 484 is connected by conductor 491 to the cathode of reverse voltage protection diode 479 and to the other end of the primary of power transformer 492. The center tap of the primary of power transformer 492 is connected to +80 volt conductor 21.

The pole of switch 481 is connected to one end of 250 ohm potentiometer 482. The wiper and other end of potentiometer 482, the other end of base shunt resistors 480 and 483, the cathodes of blocking diodes 468 and 478, the anodes of reverse voltage protection diodes 469 and 479, and the CL+ input of modulator 457 are connected by conductor 487 to one end of 0.04 ohm current sensing resistor 488. The other end of resistor 488 is connected to 80 v return conductor 23.

Ignoring, for a moment, switch 481, potentiometer 482, resistors 480 and 483, and diodes 468, 469 and 478 and 479, it will be appreciated that modulator 457, transistors 477 and 484, resistor 488, and transformer 492 form a conventional inverter power supply. Current passing through transistors 477 and 484 passes through resistor 488 and the resulting voltage developed across resistor 488 is applied to the CL+ input of modulator 457. The width of the output pulses of modulator 457 is therefore reduced if the current exceeds the desired value.

However, in a conventional inverter, transistors 477 and 484 must be a matched pair. If the match is not good, then one of the transistors will draw significantly more current, heat up, draw even more current, and so on, with thermal runaway and destruction of the transistor being the usual result, frequently followed by destruction of the other transistor.

Switch 481 and potentiometer 482 allow the safe use of unmatched transistors for transistors 477 and 484. Assume that transistor 477 has the higher beta and draws more current than transistor 484. Switch 481 is therefore placed in the first position so that the base of transistor 477 is shunted by potentiometer 482. Potentiometer 482 is then adjusted to absorb some of the output of modulator 457 so that transistor 477 receives less base drive current and therefore draws the same collector current as transistor 484. The transistors 477 and 484 are now "balanced."

If transistor 484 has the higher beta, switch 481 would be placed in the second position and potentiometer 482 adjusted to reduce the base and collector currents of transistor 484. It will be appreciated that resistor 460 limits the available output current of modulator 457 so that potentiometer 482 can draw base drive current away from transistor 477 or 484, as appropriate.

The value of potentiometer 482 is not critical but should be large enough that, when in the maximum resistance setting, negligible drive current is shunted away from the transistor base, and low enough so that the adjustment is not confined to a very small portion of the range of potentiometer 482.

It will be appreciated that a prior art method of balancing unmatched transistors is to connect a potentiometer between the bases of transistors 477 and 484 and connect the wiper of the potentiometer to conductor 487. However, this prior art method is unsatisfactory because of two problems. The capacitance across the potentiometer couples the base drive signal from the base of transistor 477 to the base of transistor 484, and vice-versa, thus simultaneously turning on both transistors 477 and 484, an undesirable, inefficient, and often destructive result. Also, there is a small, but significant, resistance between the resistance element and the wiper of the potentiometer. This also allows cross-coupling of the base drive signals and can lead to the same undesired, inefficient, and destructive result. In the preferred embodiment, potentiometer 482 does not connect between the bases of transistors 477 and 484 and therefore there is no cross-coupling of the base drive signals.

Assume now that switch 481 and potentiometer 482 have been set so that transistors 477 and 484 are "balanced." Assume now that, because of different collector-to-case heat transfer characteristics, different case-to-heatsink heat transfer characteristics, or some other reason, transistor 477 becomes hotter than transistor 484. Transistor 477 will then draw more collector current, which causes it to become even hotter, and so on, with thermal runaway and destruction again being the likely result.

Resistors 480 and 483 act to prevent this undesired event from occurring. It will be appreciated that resistors 480 and 483 shunt base drive current away from transistors 477 and 484, respectively. Resistors 480 and 483 have a positive resistance-temperature coefficient. Resistor 480 is thermally connected 486 to the case of transistor 484. Resistor 483 is thermally connected 485 to the case of transistor 477. If transistor 477 draws more collector current and becomes hotter than normal, it will heat up resistor 483 hotter than normal. This increases the resistance of resistor 483 so transistor 484 receives more base drive current and draws more collector current so that transistors 477 and 484 remain "balanced." Also, the increase in current causes modulator 457 to decrease the output pulse width, thereby limiting the total average current of transistors 477 and 484 to a safe value.

In the preferred embodiment, transistors 477 and 484 are 350 volt, 20 amp, NPN Darlington power transistors, such as the MJ10000, manufactured by Motorola, Inc., Phoenix, Ariz. The MJ10000 has an internal diode, with its cathode connected to the collector, and its anode connected to the emitter, to help prevent a negative collector voltage from destroying the transistor. However, the inventor has found that, in the preferred embodiment, the negative collector voltage causes by transformer 492 did destroy transistors 477 and 484. It is not known whether the failures occurred because the internal diode of the MJ10000 as unable to handle the current, the base-collector junction became forward biased and the MJ10000 operated in the inverted mode, or because of some other mechanism. The use of higher power, more expensive power transistors for 477 and 484 did solve the problem but increased the cost.

Diodes 468, 469, 478 and 479 prevent these failures from occurring. Diodes 468 and 478 prevent transistors 477 and 484 from operating in the inverted mode and also prevent current from passing through their internal diodes. Diodes 469 and 479 are then necessary to absorb the negative voltage spikes produced by transformer 492. Diodes 469 and 479 should be fast recovrey diodes. This allows the use of the lower power, less expensive MJ10000's for transistors 477 and 484.

Transformer 492 has several secondary windings. One of these windings is connected to 14 volt rectifier & filter 495. Rectifier & filter 495 provides +14 volts on conductor 104 and −14 volts on conductor 106. The 14 v return is conductor 105. A second winding is connected to 7 volt rectifier & filter 494. Rectifier & filter 494 provides +7 volts on conductor 100 and −7 volts on conductor 102. The 7 v return is conductor 101. A third winding is connected to 15 volt rectifier & filter 493. Rectifier & filter 493 provides a regulated +15 volts on conductor 440. The 15 v return is conductor 441. Separate secondary windings and separate return conductors are used because the circuits that are powered operate at different circuit "ground" potentials. The design of rectifier & filter 493, 494 and 495 is well known to those skilled in the art.

The +80 volt conductor 21 is connected to the positive terminal of filter capacitors 500 and 502, one terminal of high frequency filter capacitor 503, and to the "ground" input of −13.3 volt voltage regulator 501. The −13.3 volt output of regulator 501 is connected to the other end of capacitors 502 and 503 and provides a regulated −13.3 volts on conductor 430. The voltage on conductor 430 is a regulated −13.3 volt with respect to +80 v conductor 21. Conductor 430 therefore has an unregulated, nominal potential of +66.7 volts with respect to 80 v return conductor 23.

Figure 2:
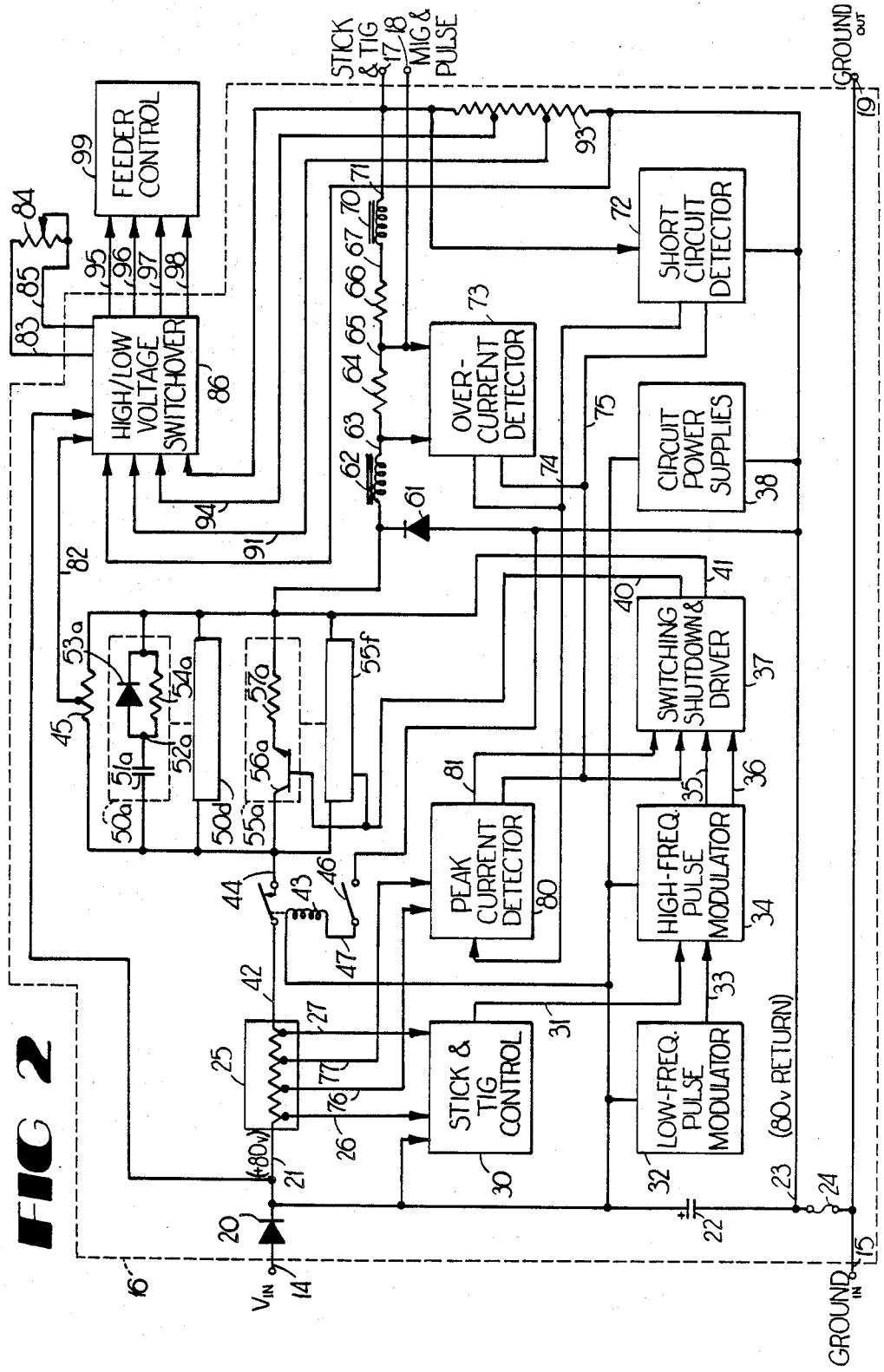
FIG. 2 is a block diagram of the weld selector station of the preferred embodiment.

The $V_{EE}$ input of regulator 497 is connected to the anode of blocking diode 497. The cathode of diode 497 and the other end of capacitor 500 are connected by conductor 431 to one end of 10 ohm resistor 496. The other end of resistor 496 is connected to 80 v return conductor 23. Conductor 431 provides the unregulated +1 volt signal which is used in pulsewidth modulators 32 and 34 of FIG. 2. The total current through regulator 501 is approximately 100 milliamps and develops the 1 volt drop across resistor 496.

The preferred embodiment of the present invention discloses a welding system with a central welding power supply and numerous, high efficiency weld selector stations and also discloses a weld selector station with the capability of adjusting arc characteristics, with automatic input voltage compensation, with the capability of accommodating different types of welding, and with a power supply which utilizes inexpensive, unmatched, low power transistors. Although the preferred embodiment of the present invention has been described with particularity, it will be understood that numerous modifications and variations are possible. Accordingly, the scope of the present invention is to be limited only by the claims below.

I claim:

1. A method for providing a balanced current flow in a first transistor and a second transistor for use in a circuit across a range of temperatures, each said transistor having a drive terminal connected to a drive source in said circuit, an output terminal connected to a drive input point of said circuit, and a common terminal connected to a reference point of said circuit, said first transistor being provided with a first drive power by said drive source, and said second transistor being provided with a second drive power by said drive source, comprising the steps of:

monitoring the temperature of said first transistor,
monitoring the temperature of said second transistor,
increasing said first drive power as said temperature of said second transistor increases; and
increasing said second drive power as said temperature of said first transistor increases.

2. An externally-matched transistor pair for use in a circuit having a first drive input point and a second drive input point, requiring matched transistors and having a first drive means and a second drive means, each of said drive means being for providing a finite amount of driving power to a respective one of said transistors, comprising:

a first transistor having a drive terminal coupled to said first drive means, an output terminal connected to said first drive input point of said circuit, a common terminal coupled to a reference point of said circuit, and having a first set of electrical characteristics;

a second transistor having a drive terminal coupled to said second drive means, an output terminal connected to a second drive input point of said circuit, a common terminal coupled to said reference point of said circuit and having a second set of electrical characteristics, said second set differing from said first set in at least one of said electrical characteristics;

switching means for selectably connecting a switched terminal to said drive terminal of said first transistor or said drive terminal of said second transistor; and power absorpotion means connected between said switched terminal and said reference point;

whereby said switching means is positioned to cause said power absorption means to absorb a portion of said driving power from the one of said driving means which is coupled to the one of said transistors which is conducting more current than the other of said transistors.

3. The externally-matched transistor pair of claim 2 wherein said power absorption means is selectably variable.

4. The externally-matched transistor pair of claim 2 wherein said power absorption means is a variable resistor.

5. The externally-matched transistor pair of claim 2 wherein said first transistor and said second transistor are bipolar transistors.

6. An improved power supply usable with unmatched transistors, comprising:
- a DC power source having a first terminal of a first polarity and a second terminal of a second polarity;
- a transformer having a center-tapped primary winding and at least one secondary winding for providing a desired output power, the center-tap of said primary winding being connected to said first terminal of said DC power source;
- a first transistor having an output termianl connected to a first end of said primary winding, an input terminal, and a reference terminal coupled to said second terminal of said DC power source;
- a second transistor having an output terminal connected to a second end of said primary winding, an input terminal, and a reference terminal coupled to said second terminal of said DC power source;
- driving means having a first drive output and a second drive output, said first drive ouptut being connected to said input terminal of said first transistor for providing drive power for said first transistor, said second drive output being connected to said input terminal of said second transistor for providing drive power for said second transistor,
- switching means for connecting a switched terminal to a selected one of said input terminal of said first transistor and said input terminal of said second transistor, said selected one of said input terminals corresponding to the one of said transistors which is conducting more current than the other of said transistors; and
- a resistor connected between said switched terminal and said second terminal;
- wherein said resistor absorbs a predetermined portion of said drive power available at said selected one of said input terminals.

7. The improved power supply of claim 6 wherein said resistor comprises a variable resistor.

8. The improved power supply of claim 6 wherein said drive means comprises a pulsewidth modulating regulator.

9. The improved power supply of claim 8 wherein said resistor comprises a variable resistor.

10. The improved power supply of claim 6 and further comprising:
- current sensing means for providing a current feedback signal responsive to an output current conducted by said first transistor and said second transistor;
- wherein said driving means is responsive to said current feedback signal for varying at least a first parameter of said first drive power and at least a first parameter of said second drive power.

11. The improved power supply of claim 10 wherein said first parameter of said first drive power and said second drive power is the width of a pulse of said drive power.

12. The improved power supply of claim 8 and further comprising:
- current sensing means for providing a current feedback signal responsive to an output current conducted by said first transistor and said second transistor;
- wherein said driving means is responsive to said current feedback signal for varying at least a first parameter of said first drive power and at least a first parameter of said second drive power.

13. The improved power supply of claim 12 wherein said first parameter of said first drive power and said second drive power is the width of a pulse of said drive power.

14. For use in a circuit having a first drive input point and a second drive input point, requiring a transistor pair having predetermined matched characteristics over a predetermined temperature range, and having a first drive means and a second drive means, each of said drive means being capable of producing a finite amount of driving power, an externallymatched transistor pair comprising:
- a first transistor having a drive terminal coupled to said first drive means, an output terminal connected to said first drive input point of said circuit, a common terminal coupled to a reference point of said circuit, and having a first set of electrical characteristics;
- a second transistor having a drive terminal connected to said second drive means, an output terminal connected to a second drive input point of said circuit, a common terminal connected to said reference point of said circuit and having a second set of electrical characteristics, said second set differing from said first set in at least one of said electrical characteristics at at least one point within said predetermined temperature range;
- first power absorption means electrically connected between said drive terminal of said first transistor and said reference point, and thermally connected to said second transistor for absorbing a portion of said driving power from said first drive means, said first power absorption means absorbing less of said driving power from said first drive means as the temperature of said second transistor increases; and
- second power absorption means electrically connected between said drive terminal of said second transistor and said reference point, and thermally connected to said first transistor for absorbing a portion of said driving power from said second drive means, said second power absorption means absorbing less of said driving power from said second drive means as the temperature of said first transistor increases.

15. The externally-matched transistor pair of claim 14 wherein said first and second power absorption means are positive temperature coefficient resistors.

16. An improved power supply usable with unmatched transistors, comprising:
- a DC power source having a first terminal of a first polarity and a second terminal of a second polarity;
- a transformer having a center-tapped primary winding and at least one secondary winding for providing a desired output power, the center-tap of said primary winding being connected to said first terminal of said DC power source;
- a first transistor having an output terminal connected to a first end of said primary winding, an input terminal, and a reference terminal coupled to said second terminal of said DC power source;
- a second transistor having an output terminal connected to a second end of said primary winding, an input terminal, and a reference terminal coupled to said second terminal of said DC power source;

driving means having a first drive output and a second drive ouptut, said first drive output being coupled to said input terminal of said first transistor for providing drive power to said first transistor, said second drive output being coupled to said input terminal of said second transistor for providing drive power to said second transistor;

a first temperature sensitive resistor being electrically connected between said drive terminal of said first transistor and said second terminal of said DC power source and being thermally connected to said second transistor for absorbing a portion of said drive power provided to said first transistor; and a second temperature sensitive resistor being electrically connected between said drive terminal of said second transistor and said second terminal of said DC power source and being thermally connected to said first transistor for absorbing a portion of said drive power provided to said second transistor.

17. The improved power supply of claim 16 and further comprising:

current sensing means for providing a current feedback signal responsive to an output current conducted by said first transistor and said second transistor, wherein said driving means is responsive to said current feedback signal for varying at least a first parameter of said first drive power and at least a first parameter of said second drive power.

18. The improved power supply of claim 17 wherein said first parameter of said first drive power and said second drive power is the width of a pulse of said drive power.

19. The improved power supply of claim 16 and further comprising:

switching means for connecting a switched terminal to a selected one of said input terminal of said first transistor and said input terminal of said second transistor; said selected one of said input terminals corresponding to the one of said transistors which is conducting more current than the other of said transistors; and a resistor connected between said switched terminal and said second terminal;

wherein said resistor absorbs a predetermined portion of said drive power available at said selected one of said input terminals

* * * * *